Figure 1:
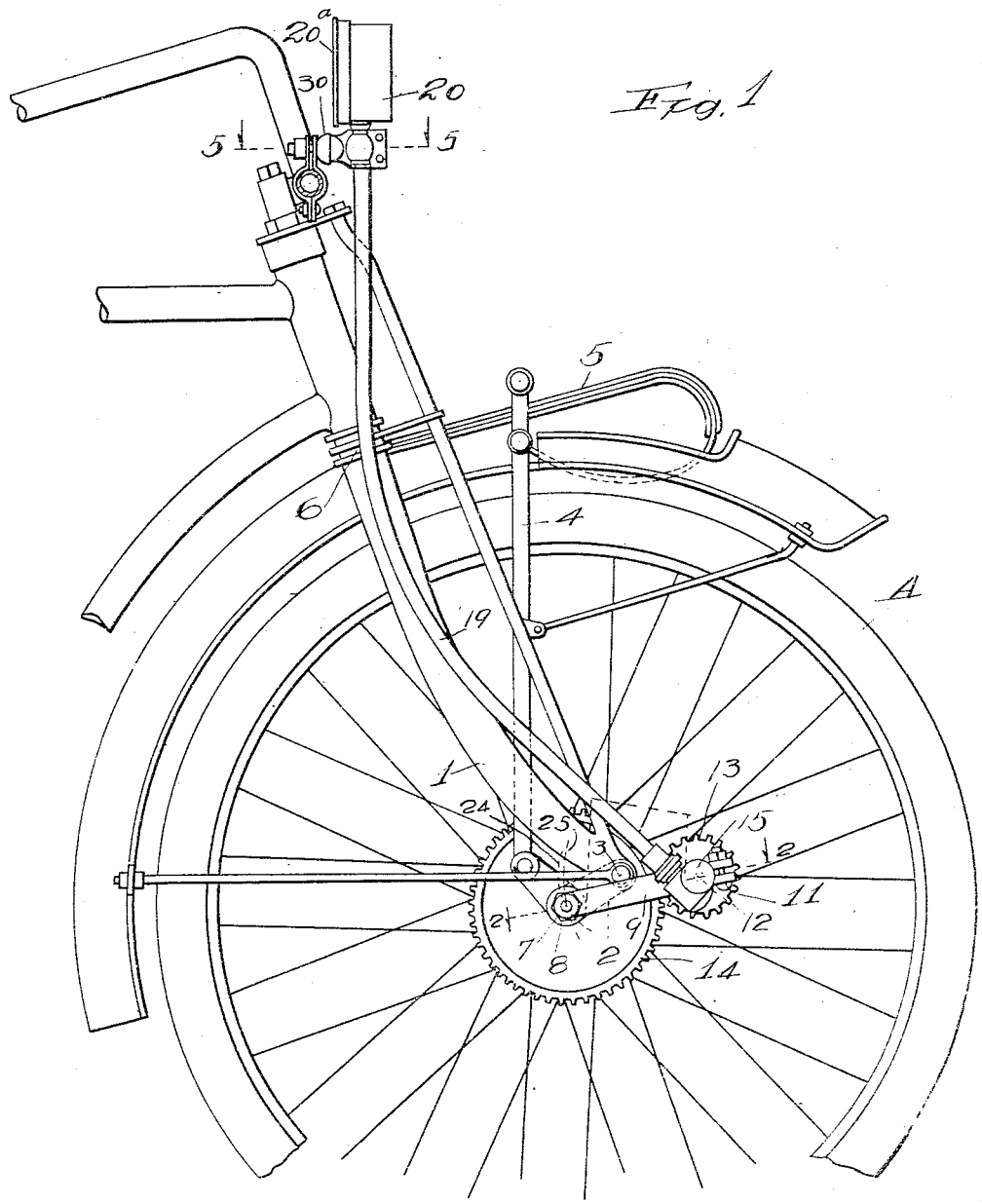

J. K. STEWART.
SPEEDOMETER DRIVING CONNECTION FOR MOTOR CYCLES.
APPLICATION FILED SEPT. 2, 1913.

1,122,656.

Patented Dec. 29, 1914.
2 SHEETS—SHEET 1.

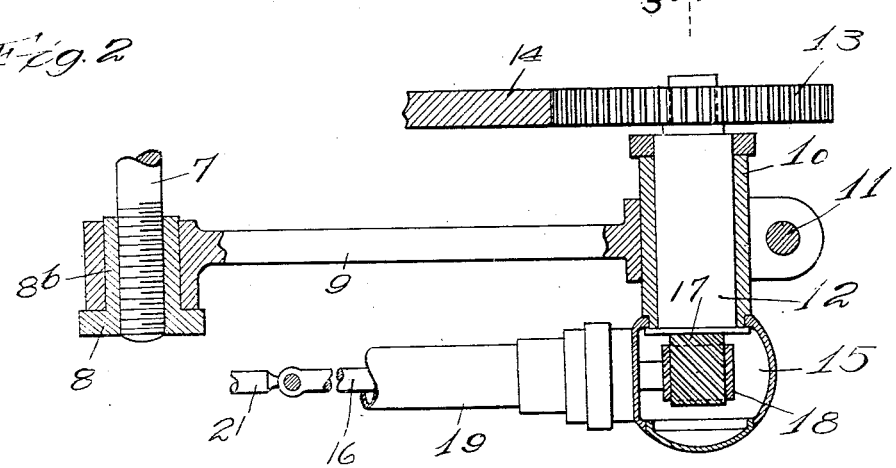
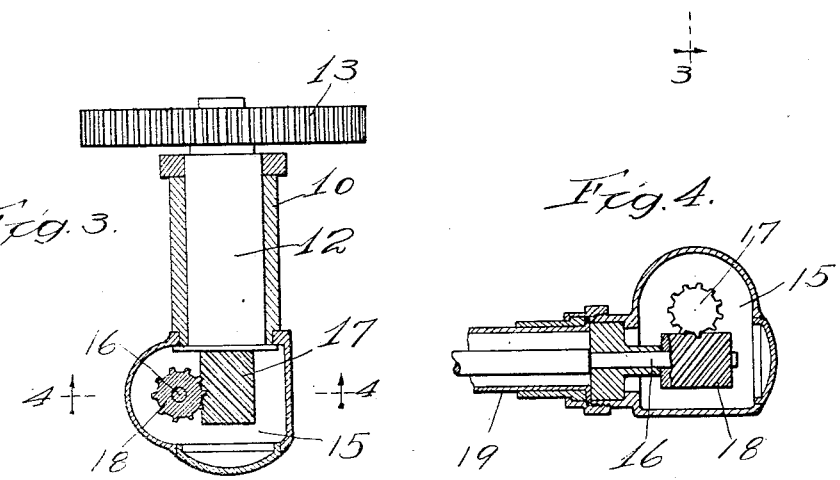
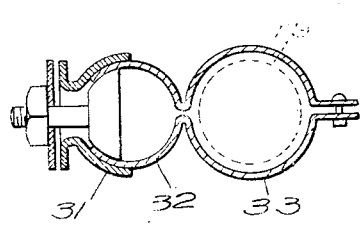

UNITED STATES PATENT OFFICE.

JOHN K. STEWART, OF CHICAGO, ILLINOIS, ASSIGNOR TO STEWART-WARNER SPEED-
OMETER CORPORATION, OF CHICAGO, ILLINOIS, A CORPORATION OF VIRGINIA.

SPEEDOMETER-DRIVING CONNECTION FOR MOTOR-CYCLES.

1,122,656.                    Specification of Letters Patent.    Patented Dec. 29, 1914.

Application filed September 2, 1913.  Serial No. 787,708.

*To all whom it may concern:*

Be it known that I, JOHN K. STEWART, a citizen of the United States, residing at Chicago, in the county of Cook and State of Illinois, have invented new and useful Improvements in Speedometer-Driving Connections for Motor-Cycles, of which the following is a specification, reference being had to the accompanying drawings, forming a part thereof.

The purpose of this invention is to provide an improved driving connection for operating a speedometer on a motor-cycle.

It consists in the elements and features of construction shown and described as indicated in the claims.

In the drawings:—Figure 1 is a side elevation of a portion of the front wheel fork and steering head of a motor-cycle equipped with this invention. Fig. 2 is a section at the line, 2—2, on Fig. 1. Fig. 3 is a section at the line, 3—3, on Fig. 2. Fig. 4 is a section at the line, 4—4, on Fig. 3. Fig. 5 is a section at the line, 5—5, on Fig. 1.

In the drawings, the device constituting this invention is shown applied to the steering fork and wheel of a bicycle of the type in which each of the fork arms is jointed near the lower end, the axle being secured to the short members of such jointed fork arms, said short members being connected by a secondary fork to a spring rigid at one end with the fork head above the wheel, this construction being familiar for absorbing the shock of the wheel in passing over irregularities of the road. The jointed fork arms each comprising members, 1 and 2, hinged together at 3, and having the member, 2, whose ends carry the axle of the ground wheel, A, connected by the secondary fork, 4, with the spring, 5, secured to the fork head at 6, constitute said familiar construction. The axle, 7, extends through the ends of the members, 2, of the jointed fork arms to one of which it is clamped by an ordinary nut, not shown. For clamping it to the other of said fork arm members, 2, there is provided an elongated nut, 8, having back of its head a cylindrical portion, 8$^b$, upon which there is journaled a link member, 9, which has at its opposite end a transverse journal bearing, 10, preferably made as a separable piece and clamped in the split end of the link by a clamping bolt, 11, as illustrated. In this transverse journal bearing, 10, there is journaled a counter shaft, 12, at the inner end of which there is mounted a pinion, 13, which meshes with a gear, 14, mounted upon the side of the ground wheel, A. At the opposite end of the counter shaft, 12, there is pivoted upon it a gear housing, 15, in which there is journaled a driven shaft, 16, and within the housing on said two shafts, 12 and 16, respectively, are intermeshing spiral gears, 17 and 18. The bearing of the driven shaft, 16, is connected by a tube, 19, with the journal bearing on the speedometer casing, 20, of the prime shaft of said speedometer, and a shaft, 21, extending in said tube connects said driven shaft, 16, with the speedometer prime shaft for operating the speedometer mechanism upon rotation of the ground wheel, A. Preferably, in order to position the speedometer at the most convenient angle for reading, and permit such speedometer to be of the more common and simpler construction in which the prime shaft has its axis parallel to the face of the instrument, the tube, 19, is curved, as shown, so that at its upper end it trends in direction parallel to the plane of the desired position of the speedometer face, 20$^a$. When this tube is thus curved, the shaft, 21, therein is necessarily a flexible or jointed shaft as illustrated.

Upon considering the above construction, it will be observed that as the ground wheel rises and falls in passing over obstructions, the axle must move in an arc about the axis of the joint between the two fork members, 1 and 2, and also about the axis of the counter shaft, 12. The dotted line arc, 24, represents the path of movement of the ground wheel axis about the first mentioned center, and the dotted line arc, 25, represents its path of movement about the second mentioned center. Since these two paths must coincide, it may be seen that by the up-and-down movement of the ground where the counter shaft, 12, will be caused to move toward and from the axis of the joint between the two fork members, 1 and 2, the total range of such movement being the maximum divergence of the two arcs, 24 and 25. This slight movement of the counter shaft, and thereby of the lower end of the tube, 19, is easily accommodated by the flexibility of a tube of the length which such tube, 21, necessarily has, and this without regard to the degree of curvature of said tube, or whether it is curved or straight.

In order to permit adjustment of the speedometer at the most desirable angle for reading to accommodate preferences of different riders, and also to adapt the entire drive connection to be applied to bicycles somewhat varying in fork length, and also to permit the speedometer to be mounted at varying distances from the steering head along the length of the handle bar to accommodate the preferences of different riders and to permit it in such adjustment to preserve its proper erect or desirably inclined position notwithstanding the curvature of the handle bar along which it may be thus adjusted, there is provided for mounting the upper end of the tube, 19, and thereby supporting the speedometer, a jointed clamp whose two members are connected together by a ball-and-socket or universal joint at 30, the member, 31, being clamped onto the handle bar, and the member, 32, being adapted to be clamped onto the coupling, 33, which terminates the tube, 19, at the upper end and serves for connecting it to the speedometer casing.

I claim:—

1. In a bicycle which has a ground wheel mounted for yielding up-and-down movement in travel, in combination with such ground wheel, a frame on which it is mounted for such up-and-down movement; a member pivotally connected with the frame on which the ground wheel is mounted, said pivotal connection being co-axial with the ground wheel; a power-communicating wheel on the ground wheel; a driven wheel journaled on said pivotally connected member for operative engagement with said power-communicating wheel; a shaft casing extending from the journal bearing of said driven wheel; means for supporting the remote end of said shaft casing on the frame; a shaft in said casing, and connections from the driven wheel for rotating said shaft; the shaft casing being positioned and dimensioned for locating the point of engagement of the driven wheel with the power-communicating wheel in a plane radial to the latter and substantially at right angles to the direction of the up-and-down movement of the wheel.

2. In a bicycle which has a ground wheel mounted for yielding up-and-down movement in travel, in combination with such ground wheel, a frame on which it is mounted for such up-and-down movement; a member pivotally connected with the frame on which the ground wheel is mounted, said pivotal connection being co-axial with the ground wheel; a power-communicating wheel on the ground wheel; a driven wheel journaled on said pivotally connected member for operative engagement with said power-communicating wheel; an inextensible shaft-casing extending from the journal bearing of said driven wheel; means for supporting the remote end of said shaft casing on the frame; a shaft in said casing, and connections from the driven wheel for rotating said shaft; the shaft casing being positioned and dimensioned for locating the point of engagement of the driven wheel with the power-communicating wheel in a plane radial to the latter and substantially at right angles to the direction of the up-and-down movement of the wheel.

3. In a bicycle which has a ground wheel mounted for yielding up-and-down movement in travel, in combination with such ground wheel, a frame on which it is mounted for such up-and-down movement; a member pivotally connected with the frame on which the ground wheel is mounted, said pivotal connection being co-axial with the ground wheel; a power-communicating wheel on the ground wheel; a driven wheel journaled on said pivotally connected member for operative engagement with said power-communicating wheel; a stiff shaft-casing extending from the journal bearing of said driven wheel; means for supporting the remote end of said shaft casing on the frame; a shaft in said casing, and connections from the driven wheel for rotating said shaft; the shaft casing being positioned and dimensioned for locating the point of engagement of the driven wheel with the power-communicating wheel in a plane radial to the latter and substantially at right angles to the direction of the up-and-down movement of the wheel.

4. In a bicycle which has a ground wheel mounted for yielding up-and-down movement in travel, in combination with such ground wheel, a frame on which it is mounted for such up-and-down movement; a member pivotally connected with the frame on which the ground wheel is mounted, said pivotal connection being co-axial with the ground wheel; a power-communicating wheel on the ground wheel, a driven wheel journaled on said pivotally connected member for operative engagement with said power-communicating wheel; a stiff and inextensible shaft-casing extending from the journal bearing of said driven wheel; means for supporting the remote end of said shaft-casing on the frame; a shaft in said casing, and connections from the driven wheel for rotating said shaft; the shaft-casing being positioned and dimensioned for locating the point of engagement of the driven wheel with the power-communicating wheel in a plane radial to the latter and substantially at right angles to the direction of the up-and-down movement of the wheel.

5. In a bicycle which has a ground wheel mounted for yielding up-and-down movement during travel, in combination with such ground wheel a frame on which it is mounted for such up-and-down movement; a member pivotally connected with the frame on which the ground wheel is mounted, such pivotal connection being coaxial with the ground wheel; a counter-shaft journaled in said pivotally-connected member; a power-communicating wheel on the ground wheel; a driven wheel on the counter-shaft operatively connected with said power-communicating wheel; a shaft-casing extending from the counter-shaft journal bearing; means for supporting the remote end of the shaft casing on the frame; a shaft in such casing, and means connecting it for rotation with said driven wheel; said shaft-casing being positioned and dimensioned for locating the point of engagement of said driven wheel with said power-communicating wheel in a plane radial with respect to the latter and substantially at right angles to the up-and-down movement of the ground wheel.

6. In a bicycle which has a ground wheel mounted for yielding up-and-down movement during travel; a frame in which the wheel is mounted for such up-and-down movement; a member pivotally connected with said frame, said pivotal connection being coaxial with the ground wheel; a power-communicating wheel on the ground wheel; a counter-shaft journaled in said pivotally connected member; a driven wheel on the counter-shaft in operative relation to the power-communicating wheel; a shaft-casing extending from the counter shaft journal bearing, and means for supporting the remote end of said shaft casing on the frame; a shaft in said casing; intermeshing gears on said last mentioned shaft and the counter-shaft respectively, the shaft casing being positioned and dimensioned for locating the journal bearing of the counter-shaft in a plane which is radial to the power-communicating wheel and approximately at right angles to the direction of up-and-down movement of the ground wheel.

7. In a bicycle which has a ground-wheel mounted for yielding up-and-down movement in travel, in combination with such ground-wheel a frame on which it is mounted for such up-and-down movement with respect to said frame; a member pivotally connected with said frame, said pivotal connection being co-axial with the ground-wheel; a power-communicating wheel on the ground-wheel; a driven wheel journaled on said pivotally connected member for operative engagement with said power-communicating wheel; a shaft bearing mounted on said frame at a point which is remote from the ground-wheel bearing, and with respect to which the ground wheel has said up-and-down movement; means connecting said last mentioned bearing with the journal bearing of said driven wheel; a shaft journaled in said remote bearing, and connections from the driven wheel for rotating said shaft, said means connecting said bearings being positioned and dimensioned for locating the point of engagement of the driven wheel with the power-communicating wheel in a plane radial to the latter and substantially at right-angles to the direction of the up-and-down movement of the wheel.

In testimony whereof, I have hereunto set my hand at Chicago, Illinois, this 20th day of August, 1913.

JOHN K. STEWART.

Witnesses:
LUCY I. STONE,
M. GERTRUDE ADY.